(12) United States Patent
Ukai (10) Patent No.: US 12,126,890 B2
(45) Date of Patent: Oct. 22, 2024

(54) IMAGE PROCESSING METHOD AND IMAGE PROCESSING APPARATUS

(71) Applicant: YAMAHA CORPORATION, Hamamatsu (JP)

(72) Inventor: Satoshi Ukai, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 18/161,269

(22) Filed: Jan. 30, 2023

(65) Prior Publication Data
US 2023/0254569 A1    Aug. 10, 2023

(30) Foreign Application Priority Data

Feb. 10, 2022 (JP) ................................ 2022-019701

(51) Int. Cl.
*H04N 23/611* (2023.01)
*H04N 23/60* (2023.01)
*H04N 23/63* (2023.01)

(52) U.S. Cl.
CPC ......... *H04N 23/611* (2023.01); *H04N 23/632* (2023.01); *H04N 23/64* (2023.01)

(58) Field of Classification Search
CPC .... H04N 23/611; H04N 23/632; H04N 23/64; G06T 5/77; G06T 2207/10016; G06T 2207/20092; G06T 2207/20221; G06T 2207/30196; G06T 5/50; G06T 7/194; G06T 7/50; G06T 7/73; G06T 1/20; G06T 1/60; G06T 7/0002; G06T 7/11; G06T 3/04; G06F 3/04845; G06F 3/04847
See application file for complete search history.

(56) References Cited

U.S. PATENT DOCUMENTS

| | | | |
|---|---|---|---|
| 2009/0324023 A1 | 12/2009 | Tian et al. | |
| 2010/0066840 A1* | 3/2010 | Asukai | H04N 5/262 348/222.1 |
| 2017/0316575 A1 | 11/2017 | Adachi | |

FOREIGN PATENT DOCUMENTS

JP    2012029209 A    2/2012

OTHER PUBLICATIONS

Extended European Search Report issued in European Appln. No. 23154433.9 mailed on Jul. 5, 2023.

* cited by examiner

*Primary Examiner* — Yogesh K Aggarwal
(74) *Attorney, Agent, or Firm* — ROSSI, KIMMS & McDOWELL LLP (57) ABSTRACT

An image processing method obtains a first input image from a camera, generates a background image based on the first input image, determines whether the first input image includes a specific object, determines whether the specific object satisfies a predetermined position condition in a case where the first input image includes the specific object, and replaces the specific object that satisfies the predetermined position condition with the background image.

18 Claims, 10 Drawing Sheets

IMAGE PROCESSING METHOD AND IMAGE PROCESSING APPARATUS

CROSS REFERENCE TO RELATED APPLICATIONS

This Nonprovisional application claims priority under 35 U.S.C. § 119(a) on Patent Application No. 2022-019701 filed in Japan on Feb. 10, 2022, the entire contents of which are hereby incorporated by reference.

BACKGROUND

Technical Field

An embodiment of the present disclosure relates to an image processing method and an image processing apparatus that process an image inputted from a camera.

Background Information

Japanese Unexamined Patent Application Publication No. 2012-29209 discloses a system that recognizes a person and blurs an image other than a recognized person.

The system disclosed in Japanese Unexamined Patent Application Publication No. 2012-29209 blurs background and thus gives a user a feeling of strangeness. In addition, the system disclosed in Japanese Unexamined Patent Application Publication No. 2012-29209 may output an image without blurring a person other than a participant (a specific object), in some cases.

SUMMARY

In view of the foregoing, an aspect of the present disclosure is directed to provide an image processing method that avoids outputting a specific object without providing a feeling of strangeness.

An image processing method obtains a first input image from a camera, generates a background image based on the first input image, determines whether the first input image includes a specific object, determines whether the specific object satisfies a predetermined position condition in a case where the first input image includes the specific object, and replaces the specific object that satisfies the predetermined position condition with the background image.

According to an embodiment of the present disclosure, an output of a specific object is able to be avoided without providing a feeling of strangeness.

DETAILED DESCRIPTION

Figure 1:
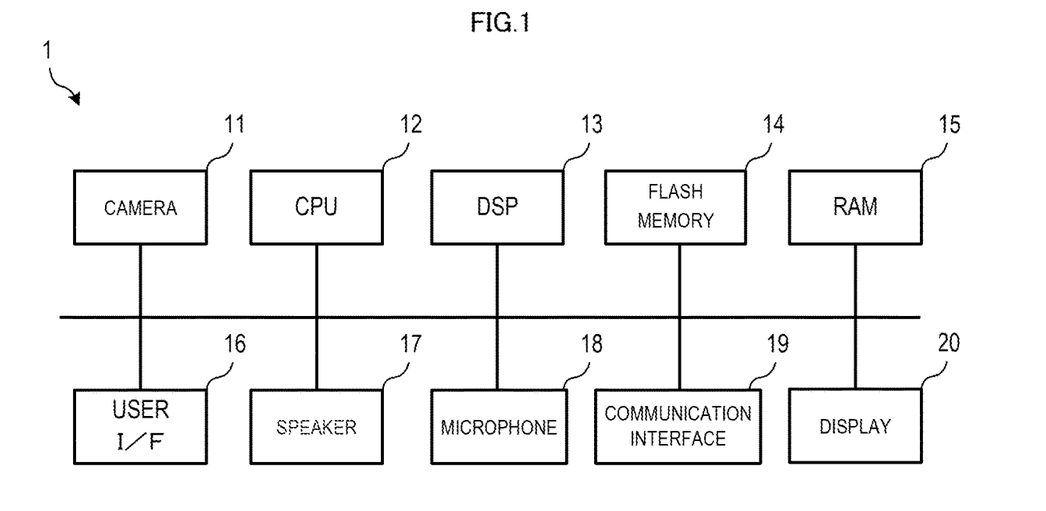
FIG. 1 is a block diagram showing a configuration of an image processing apparatus 1.

FIG. 1 is a block diagram showing a configuration of an image processing apparatus 1. The image processing apparatus 1 includes a camera 11, a CPU 12, a DSP 13, a flash memory 14, a RAM 15, a user interface (I/F) 16, a speaker 17, a microphone 18, a communication interface 19, and a display 20.

The camera 11, the speaker 17, and the microphone 18 are placed, for example, either up, down, left, or right toward the display 20. The camera 11 obtains an image of a user present in front of the display 20. The microphone 18 obtains a voice of the user present in front of the display 20. The speaker 17 outputs a sound to the user present in front of the display 20.

The CPU 12, which is an example of a processor, reads out an operating program from the flash memory 14 to the RAM 15 and functions as a controller that collectively controls operations of the image processing apparatus 1. It is to be noted that the program does not need to be stored in the flash memory 14 of the own apparatus. The CPU 12 may download the program each time from a server or the like, for example, and may read out the program to the RAM 15.

The DSP 13 performs various types of processing on the image obtained by the camera 11 according to the control of the CPU 12. The DSP 13 also performs various types of processing on the sound obtained by the microphone 18. However, processing the sound is not an essential configuration in present disclosure.

The communication interface 19 sends a video signal of the image that has been processed by the DSP 13, to a different apparatus. In addition, the communication interface 19 sends an audio signal that has been processed by the DSP 13, to a different apparatus. The different apparatus is, for example, an information processing apparatus such as a PC on a far-end side to be connected through the Internet or the like. In addition, the communication interface 19 receives a video signal and an audio signal from the different apparatus. The communication interface 19 outputs a received video signal to the display 20. The communication interface 19 outputs a received audio signal to the speaker 17. The display 20 displays an image obtained by a camera of the different apparatus. The speaker 17 outputs a voice of a talker obtained by a microphone of the different apparatus. As a result, the image processing apparatus 1 functions as a communication system in order to perform a voice conversation with a person at a remote location.

Figure 2:
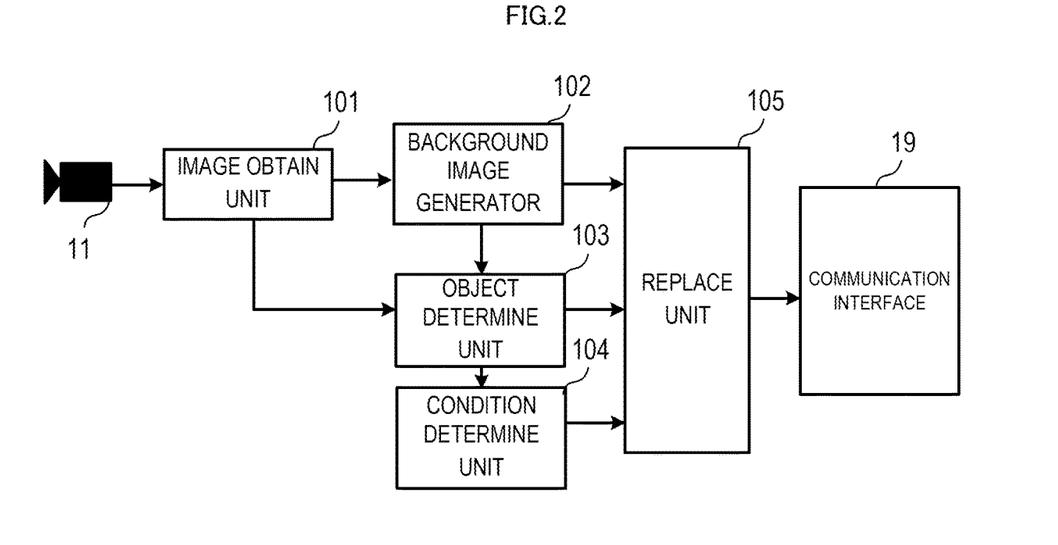
FIG. 2 is a functional block diagram of the image processing apparatus 1.

FIG. 2 is a block diagram showing a configuration of an image processing function configured the CPU 12 and the DSP 13. The image processing function includes an image obtain unit 101, a background image generator 102, an object determine unit 103, a condition determine unit 104, and a replace unit 105.

Figure 3:
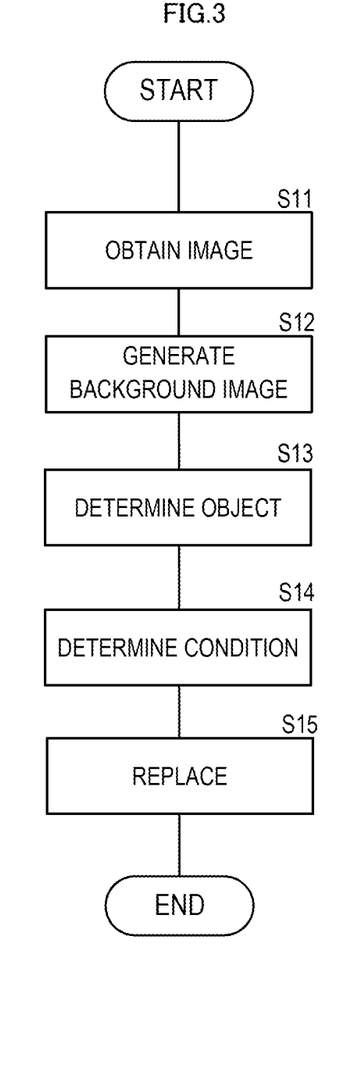
FIG. 3 is a flow chart showing an operation of an image processing method.

FIG. 3 is a flow chart showing an operation of an image processing method. The image obtain unit 101 obtains an image (a first input image) captured by the camera 11 (S11). The background image generator 102 generates a background image based on the first input image (S12). The object determine unit 103 determines whether or not the first input image includes a specific object (a person) (S13). The condition determine unit 104, in a case in which the first input image includes the person, determines whether or not the person satisfies a predetermined position condition (S14). The replace unit 105 replaces the person who satisfies the predetermined position condition with the background image (S15).

Figure 4:
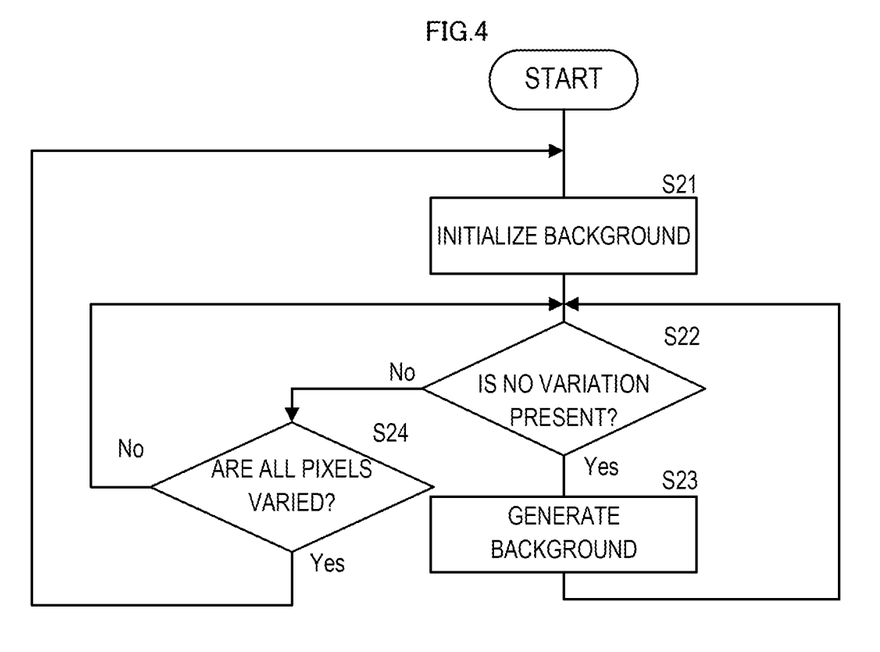
FIG. 4 is a flow chart showing an example of an operation of a background image generator 102.

FIG. 4 is a flow chart showing an example of an operation of the background image generator 102. The background image generator 102 first initializes the background image (S21). Subsequently, the background image generator 102 determines the presence of time variation for each pixel of the first input image (S22). In other words, the background image generator 102 compares the first input image obtained at a certain first timing with a second input image obtained at a second timing different from the first timing. The background image generator 102 generates a background image by unvaried pixels in the first input image and the second input image (S23). A generated background image is outputted to the replace unit 105.

The background image generator 102, in a case of determining a varied pixel in the first input image and the second input image, determines whether or not the image of all pixels has further varied (S24). The background image generator 102, in a case of determining that the image of all pixels has varied, returns to initialization of the background image (S24: Yes→S21). The background image generator 102, in a case of determining that the image of all pixels has not varied, returns to determination of S22. It is to be noted that the processing of S24 may determine not all pixels but whether or not the number of pixels that has varied with respect to the total number of pixels, such as 50%, for example, exceeds a predetermined value (a predetermined percentage).

As a result, a temporally unvaried region becomes a background image. Even though a person moves and a pixel corresponding to the person does not become a background image at a certain timing, the person in the pixel moves to a different pixel, and thus a background image is generated for all pixels over time.

It is to be noted that each of the first input image and the second input image is not limited to an image of one frame. In addition, the first timing and the second timing do not need to be temporally continuous. The background image generator 102 may use an image obtained by averaging a plurality of frames, for example, as the first input image and the second input image. As a matter of course, the first input image and the second input image each being even an averaged image correspond to an image obtained at a temporally different timing.

Next, the object determine unit 103 will be described. The object determine unit 103 determines whether or not the first input image includes a specific object (a person). The object determine unit 103 specifies a plurality of pixels that render one person by performing image segmentation processing, for example. The image segmentation processing is processing to recognize a boundary between a person and a background by using a predetermined algorithm by use of a neural network or the like, for example.

Figure 5A:
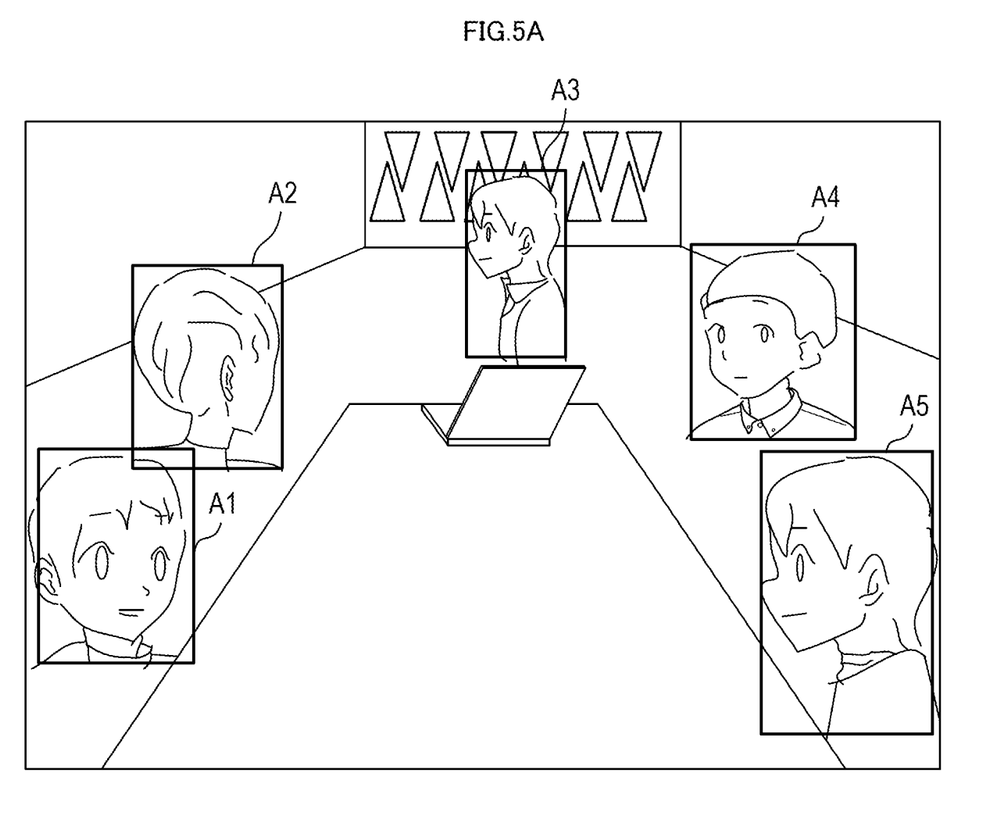
FIG. 5A is a view showing an example of an image captured by a camera 11.

FIG. 5A is a view showing an example of an image captured by the camera 11. In the example of FIG. 5A, the camera 11 captures a face image of each of a plurality of persons that are present in a longer direction (a depth direction) of a table. The camera 11 captures four persons on the left side and the right side of the table in a shorter direction, and a person at a position far from the table.

Figure 5B:
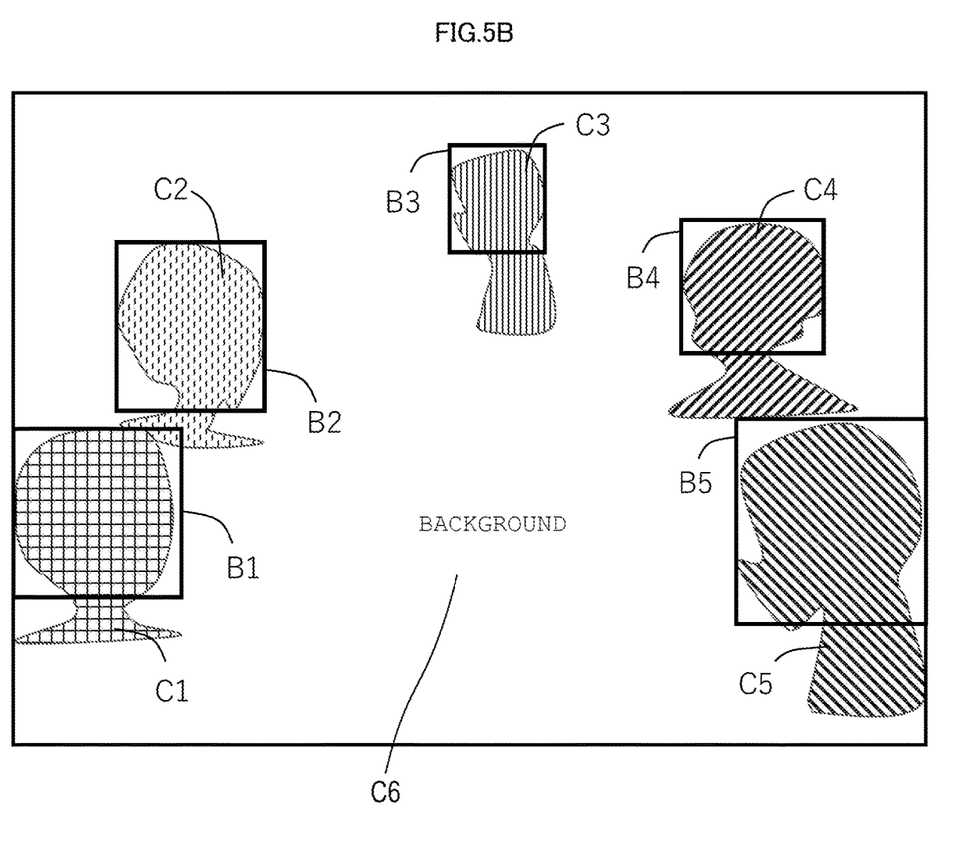
FIG. 5B is a view showing an example of an output of an object determine unit 103.

The object determine unit 103 recognizes a pixel of a person from such an image captured by the camera 11. In a case in which the image captured by the camera 11 is an image shown in FIG. 5A, the object determine unit 103 recognizes a boundary between a body of each of five persons A1 to A5 and a background. The object determine unit 103, as shown in FIG. 5B, to each pixel, generates labels (C1 to C5, C6) each of which cause the pixel to correspond to the persons A1 to A5 or the background, and outputs the labels to the replace unit 105. The labels C1 to C5 are labels corresponding to the persons A1 to A5. The label C6 is a label corresponding to the background. It is to be noted that the object determine unit 103 may set a boundary box (Bounding Box) as shown by squares B1 to B5 in FIG. 5B, at a position of the face of a recognized person. The object determine unit 103 may output position information on the boundary box to the replace unit 105.

Furthermore, the object determine unit 103 obtains a distance from each person, based on a size of the boundary box. The flash memory 14 previously stores a table, a function, or the like that shows the relationship between the size of a boundary box and the distance. The object determine unit 103 compares the size of a set boundary box and the table stored in the flash memory 14, and obtains a distance from a person.

It is to be noted that the object determine unit 103 may estimate the distance from the person from the total number of pixels having a label showing a specific person or the maximum number of vertically consecutive pixels and the maximum number of horizontally consecutive pixels having the label showing a specific person. Moreover, the object determine unit 103 may estimate a body of the person from the image captured by the camera 11, and may estimate a position of the person. The object determine unit 103, by the predetermined algorithm using a neural network or the like, obtains a framework (a bone) of the person from the image captured by the camera 11. The bone includes an eye, a nose, a neck, a shoulder, a hand, and a leg. The flash memory 14 previously stores a table, a function, or the like that shows the relationship between the size of a bone and the distance. The object determine unit 103 may compare the size of a recognized bone and the table stored in the flash memory 14, and may obtain a distance from the person.

In addition, the method of estimating a distance is not limited to the above example. For example, in a case in which the camera 11 is a stereo camera (with two or more cameras), the object determine unit 103 is able to obtain the distance from each person, based on a distance between two cameras and a disparity between two images. In addition, the object determine unit 103 may obtain the distance from each person by using a ranging mechanism such as LiDAR (Light Detection and Ranging).

The object determine unit 103 outputs identification information (label information such as A1 or A2, for example) of each pixel, to the replace unit 105, and outputs information that shows a two-dimensional angle of each person and a distance from a camera, to the condition determine unit 104. In other words, in this example, the object determine unit 103 outputs three-dimensional position information to the condition determine unit 104, as position information on each person.

The condition determine unit 104 determines whether or not the position information on each person satisfies a predetermined position condition. The predetermined position condition is a case in which a value of the distance is greater than or equal to a predetermined value, for example. In the example of FIG. 5A, the persons A1, A2, A4, and A5 are close to the camera 11, and do not satisfy the predetermined position condition. The person A3 is far from the camera 11, and satisfies the predetermined position condition.

Therefore, the condition determine unit 104 determines that the person A3 satisfies the predetermined position condition, and outputs information that shows that the person A3 satisfies a position condition, to the replace unit 105.

Figure 6:
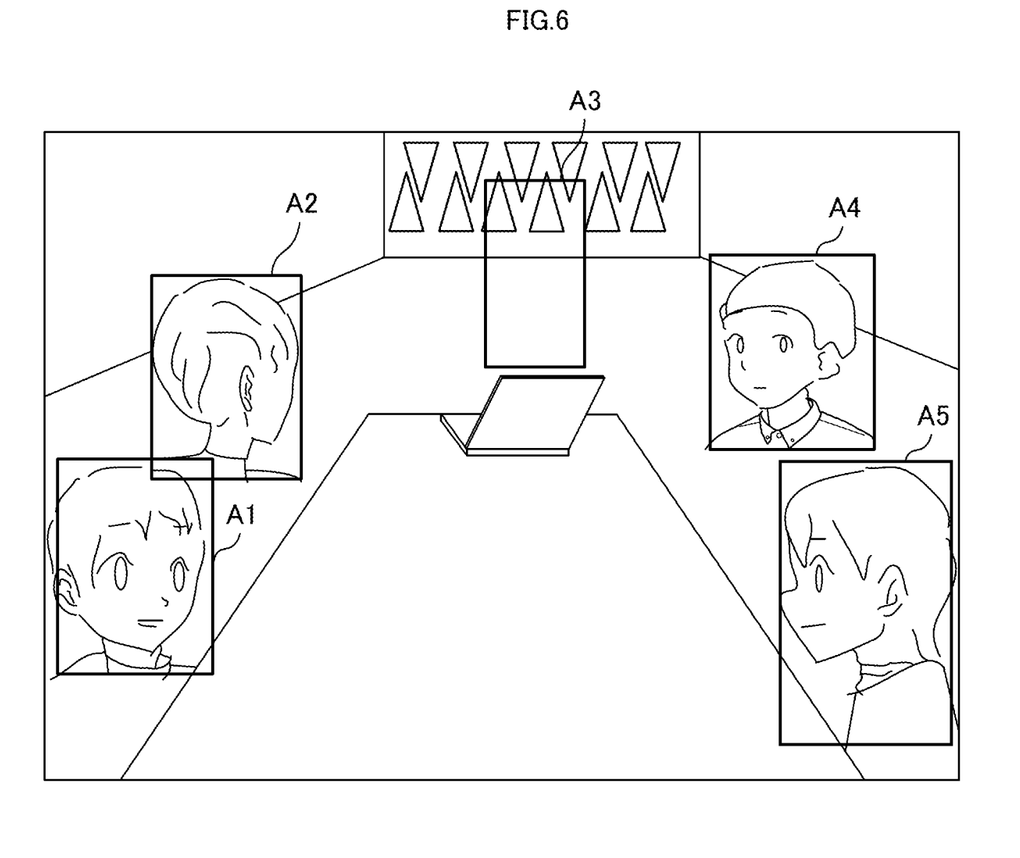
FIG. 6 is a view showing an example of a relaced image.

The replace unit 105 replaces an image of the person who satisfies the position condition with a background image. In the example of FIG. 5A, since the person A3 satisfies the position condition, a pixel with the label C3 corresponding to the person A3 is replaced with a pixel of the background image generated by the background image generator 102. As a result, as shown in FIG. 6, the pixel C3 with the label corresponding to the person A3 is replaced with the pixel of the background image. It is to be noted that the replace unit 105, in a case in which generation of the background image is not completed in a pixel to be replaced, may output the image of the camera 11 as it is or may replace the pixel by a specific color. The replace unit 105 may average pieces of color information of pixels around the pixel to be replaced, and may replace the pixel with color of an average value. As a result, the replace unit 105 is able to replace even a non-generated background image with an image without a feeling of strangeness.

As described above, the image processing apparatus 1 according to the present embodiment, since replacing a person at a distant place with a background image, is able to prevent an image of a person other than a conference participant from being outputted without giving a feeling of strangeness.

In the above example, the background image generator 102 generates a background image by using a temporally unvaried pixel. However, the background image generator 102 may generate a background image by using a determination result of the object determine unit 103. The background image generators 102 specifies a region in which both of the first input image and the second input image include no person, and generates an image of a specified region as a background image. In such a case, the background image generator 102 may use the pixel of the first input image or may use the pixel of the second input image.

Alternatively, the background image generator 102, in a case in which a region includes a person in the first input image and a region includes no person in the second input image, may generate a background image by using a pixel of the region of the second input image. Conversely, the background image generator 102, in a case in which a region includes no person in the first input image and a region includes a person in the second input image, may generate a background image by using a pixel of the region of the first input image.

The above embodiment shows the condition of the three-dimensional position including a distance, as a "predetermined position condition." However, the "predetermined position condition" is not limited to the condition of the three-dimensional position including a distance. The condition determine unit 104 may also use a predetermined position condition that an angle of view is within a predetermined angle, for example. In such a case, the condition determine unit 104 may receive setting of the angle of view from a user. For example, a user, in a case in which the front of the camera 11 is set to 0 degrees, designates a range from 30 degrees (−30 degrees) on the left side to 30 degrees (+30 degrees) on the right side, from the camera 11. In such a case, the condition determine unit 104 determines that a person in a pixel corresponding to an angle of view of −30 degrees to +30 degrees does not satisfy a predetermined position condition, from the image of the camera 11. In addition, the condition determine unit 104 determines that a person of a pixel corresponding to the outside of a range of the angle of view of −30 degrees to +30 degrees satisfies the predetermined position condition, from the image of the camera 11.

Figure 7:
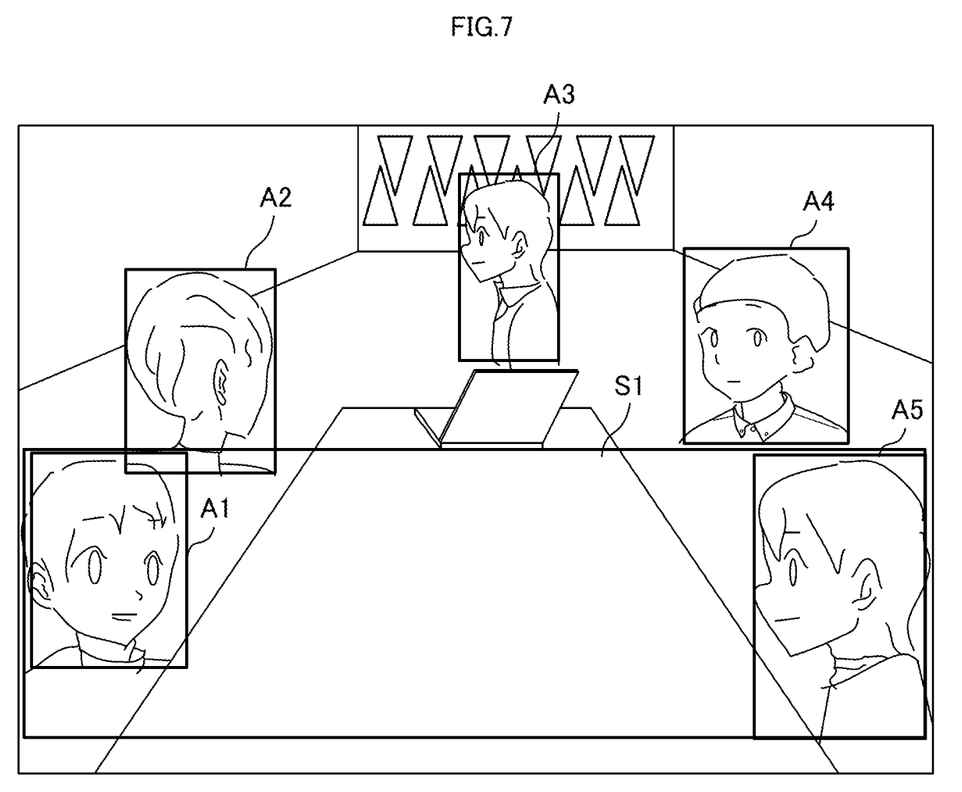
FIG. 7 is a view showing an example of an image captured by the camera 11.

Alternatively, the condition determine unit 104 may receive a designation of a pixel range out of the image of the camera 11. For example, as shown in FIG. 7, the user designates a certain pixel range S1 from the image of the camera 11. The condition determine unit 104 determines that a person in the pixel range S1 does not satisfy a predetermined position condition from the image of the camera 11. In addition, the condition determine unit 104 determines that a person of a pixel corresponding to the outside of the pixel range S1 satisfies the predetermined position condition, from the image of the camera 11. In the example of FIG. 7, the condition determine unit 104 outputs information showing that the persons A2, A3, and A4 satisfy the position condition to the replace unit 105. As a result, the replace unit 105 replaces a pixel corresponding to the persons A2, A3, and A4 with a background image.

In this manner, the image processing apparatus 1 according to the present embodiment may receive a designation of a position condition from a user. Furthermore, the image processing apparatus 1 according to the present embodiment may display a predetermined space on the display 20, and may receive the designation of a position condition with respect to the predetermined space.

Figure 8A:
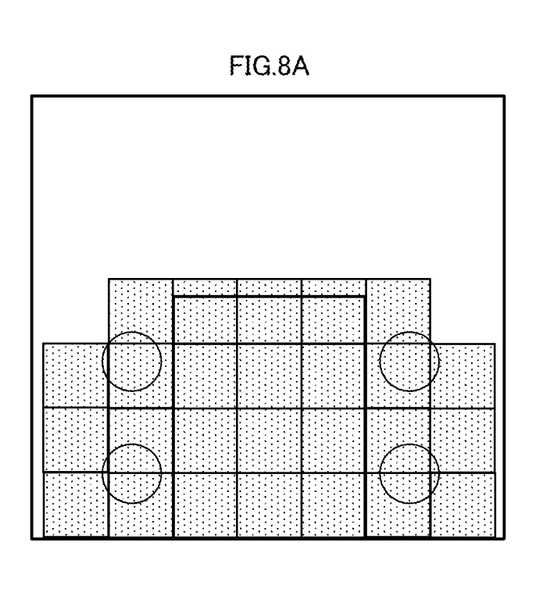
FIG. 8A is a view showing an example of a GUI displayed on a display 20.

FIG. 8A is a view showing an example of a GUI displayed on the display 20. The CPU 12 of the image processing apparatus 1 displays a predetermined space as shown in FIG. 8A, on the display 20. In such a case, the CPU 12 functions as a display processor. In the example of FIG. 8A, the CPU 12 displays a two-dimensional plane image that simulates an interior of a room, on the display 20. The CPU 12 also displays a plane image that simulates a table and a chair.

The CPU 12 receives a designation of a position condition with respect to the two-dimensional plane image through the user I/F 16. The user I/F 16 includes a mouse, a keyboard, or a touch panel superimposed on the display 20, and is an example of the receiver. When the user selects any position of the two-dimensional plane image shown in FIG. 8A, the CPU 12 receives pixel coordinates (two-dimensional coordinates) and distance information corresponding to a selected position as the "position condition." In addition, the CPU 12 superimposes and displays an image (a hatching image in the example of FIG. 8A) showing a selected position.

Figure 8B:
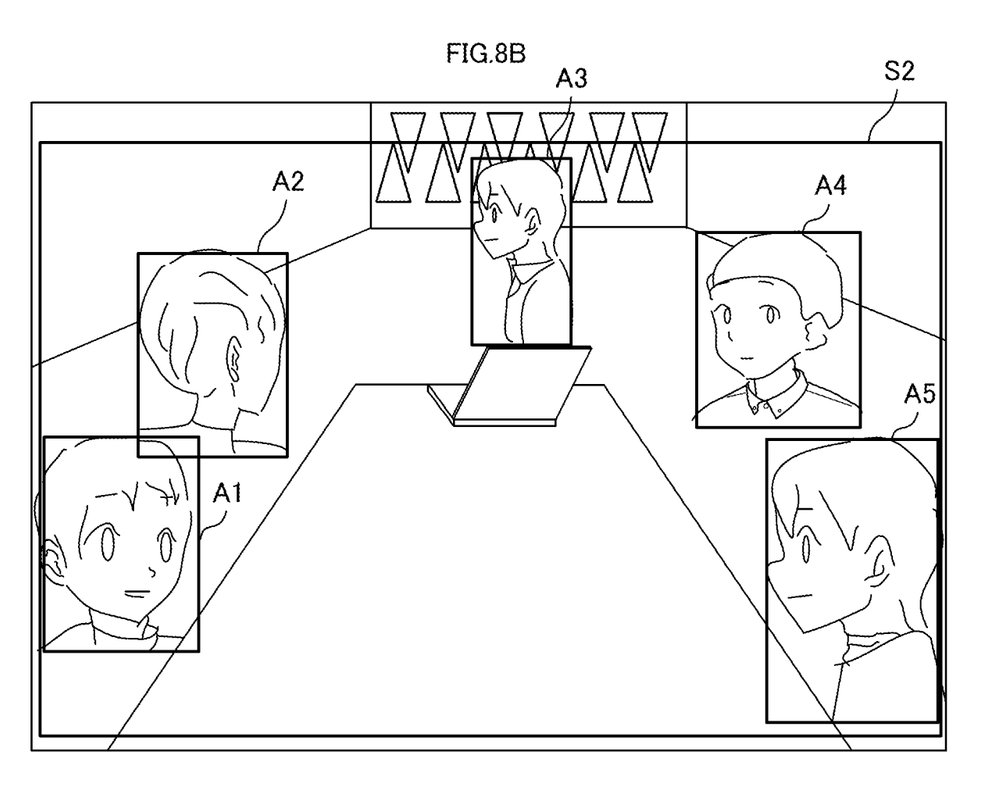
FIG. 8B is a view showing an example of an image captured by the camera 11.

The left and right positions of the two-dimensional plane image shown in FIG. 8A correspond to the X coordinate of the pixel coordinates. The upper and lower positions of the two-dimensional plane image shown in FIG. 8A correspond to the distance information. The Y coordinate of the pixel coordinates is received as if all pixels are selected. Alternatively, the Y coordinate of the pixel coordinates may receive a numerical value (a numerical value such as 0.7 to 2 m, for example) of a height range to satisfy a predetermined position condition from a user. Alternatively, as shown in FIG. 8B, the CPU 12 may superimpose and display an image (a box S2) corresponding to the position condition, in the predetermined space displayed on the display 20. In such a case, the CPU 12 may receive an operation to change upper and lower size of the box S2. The CPU 12 causes the upper and lower size of the box S2 to correspond to height information (a Y-coordinate range of the pixel coordinates).

The condition determine unit 104 determines whether or not each person satisfies the predetermined position condition according to the position condition received in the two-dimensional plane image of FIG. 8A, from the image of the camera 11. In the example of FIG. 8A, the condition determine unit 104 determines that the person A3 satisfies the predetermined position condition, and outputs the information that shows that the person A3 satisfies the position condition, to the replace unit 105. As a result, the replace unit 105 replaces a pixel corresponding to the person A3 with a background image.

Figure 9A:
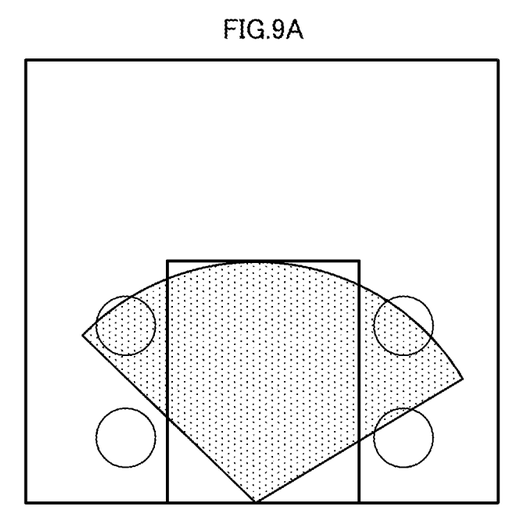
FIG. 9A is a view showing an example of a GUI displayed on the display 20.

FIG. 9A is a view showing another example of a GUI displayed on the display 20. The CPU 12 of the image processing apparatus 1, as with FIG. 8A, displays a predetermined space on the display 20.

The CPU 12 receives the designation of a position condition with respect to the two-dimensional plane image through the user I/F 16. In the example of FIG. 9A, the CPU 12 superimposes an image with a fan shape corresponding to the position condition on the two-dimensional plane image, and displays the image on the display 20. A user performs an operation to change a size of the fan shape. For example, the user, by touching an arc of the fan shape and performing a swipe operation, can change a radius of the fan shape. The user, by touching a straight portion of the fan shape and performing a swipe operation, can change an internal angle of the fan shape.

Figure 9B:
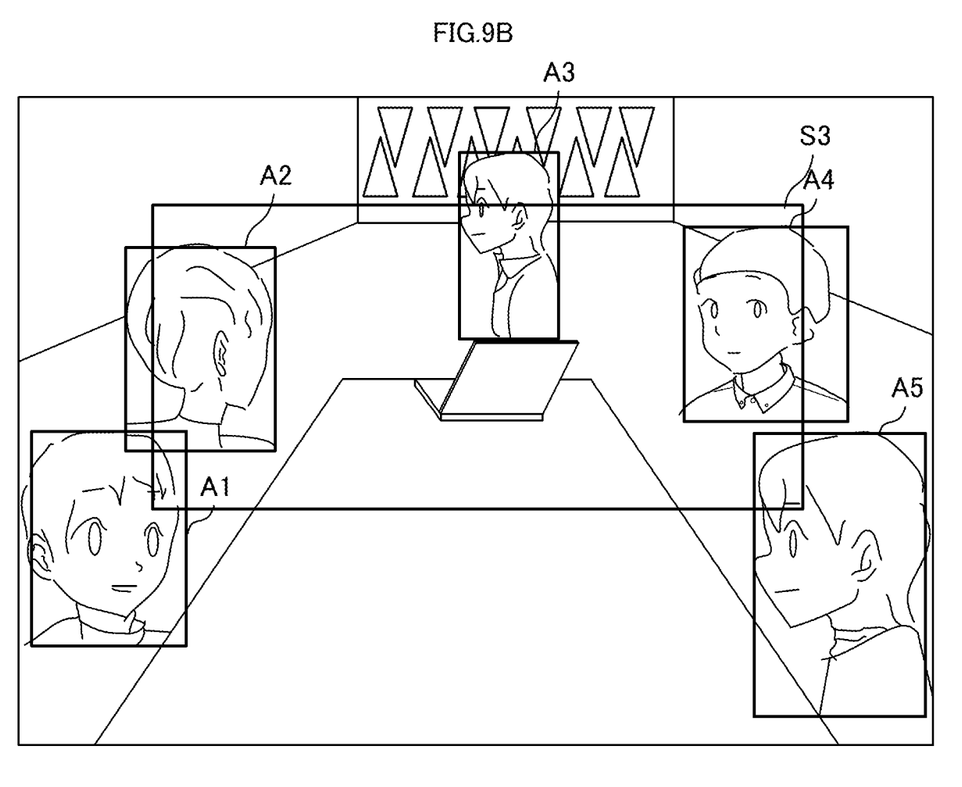
FIG. 9B is a view showing an example of an image captured by the camera 11.

The CPU 12 receives the angle of view and distance information corresponding to the size of the fan shape as a "position condition." The radius of a fan-shaped image shown in FIG. 9A corresponds to the distance information. A left and right opening angle of the fan-shaped image shown in FIG. 9A corresponds to an angle of view, and corresponds to the X coordinate of the pixel coordinates. The Y coordinate of the pixel coordinates is received as if all pixels are selected. Alternatively, the Y coordinate of the pixel coordinates may receive a numerical value (a numerical value such as 0.7 to 2 m, for example) of the height information from the user. Alternatively, as shown in FIG. 9B, the CPU 12 may superimpose and display an image (a box S3) corresponding to the fan shape, in the predetermined space displayed on the display 20. In such a case, the CPU 12 may receive an operation to change upper and lower size of the box S3. The CPU 12 causes the upper and lower size of the box S3 to correspond to the height information (the Y coordinate of the pixel coordinates).

In such a case as well, the condition determine unit 104 determines whether or not each person satisfies the predetermined position condition according to the position condition received in the two-dimensional plane image of FIG. 9A, from the image of the camera 11. In the example of FIG. 9A, the condition determine unit 104 determines that the persons A1, A3, and A5 satisfy the predetermined position condition, and outputs the information that shows that the persons A1, A3, and A5 satisfy the position condition, to the replace unit 105. As a result, the replace unit 105 replaces a pixel corresponding to the persons A1, A3, and A5 with a background image.

It is to be noted that the condition determine unit 104 may determine whether or not all ranges of a boundary box corresponding to the image of each person satisfy the predetermined position condition or may determine whether or not a part of the boundary box satisfies the predetermined position condition. The condition determine unit 104, in a case of determining whether or not a part of the boundary box satisfies the predetermined position condition, may determine that the person in the bounding box satisfies the predetermined position condition in a case in which the number of pixels that satisfy the position condition exceeds a predetermined value (a predetermined percentage), such as 50%, for example, with respect to the total number of pixels in the bounding box.

The description of the present embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

For example, the specific object is not limited to a person. The specific object may be an animal, a screen of a PC, or a paper document, for example. For example, even when confidential information unrelated to a conference in the screen of a PC or the paper document is described, the image processing apparatus according to the present embodiment replaces the specific object in which such confidential information is described, with a background image. As a result, the image processing apparatus according to the present embodiment is able to output an image without a feeling of strangeness while maintaining privacy.

What is claimed is:

1. An image processing method comprising:
    obtaining a first input image from a camera at a first timing and a second input image from the camera at a second timing that is different from the first timing;
    generating a background image based on the first input image and the second input image;
    determining whether the first input image includes a specific object;
    determining whether the specific object satisfies a predetermined position condition in a case where the first input image includes the specific object; and
    replacing the specific object that satisfies the predetermined position condition with the background image,
    wherein the generating compares the first input image and the second input image, and generates the background image using an unvaried region.

2. The image processing method according to claim 1, wherein the predetermined position condition is a condition of a three-dimensional position including a distance.

3. The image processing method according to claim 2, wherein the predetermined position condition is satisfied in a case where the distance exceeds a predetermined value.

4. The image processing method according to claim 1, wherein the specific object includes an image of a person.

5. The image processing method according to claim 1, wherein the determining of whether the specific object satisfies the predetermined position condition is performed based on a size of the specific object.

6. The image processing method according to claim 1, further comprising receiving a designation of the predetermined position condition from a user.

7. The image processing method according to claim 6, further comprising:
    displaying a predetermined space on a display,
    wherein the receiving of the designation of the predetermined position condition is performed with respect to the predetermined space.

8. The image processing method according to claim 7, further comprising superimposing and displaying an image corresponding to the predetermined position condition, in the predetermined space.

9. The image processing method according to claim 1, wherein the unvaried region is a temporally unvaried region containing only unvaried pixels.

10. An image processing apparatus comprising a processor that:
- obtains a first input image from a camera at a first timing and obtains a second input image from the camera at a second timing that is different from the first timing;
- generates a background image based on the first input image and the second input image;
- determines whether the first input image includes a specific object;
- determines whether the specific object satisfies a predetermined position condition in a case where the first input image includes the specific object; and
- replaces the specific object that satisfies the predetermined position condition with the background image,
- wherein the processor, in generating the background image, compares the first input image and the second input image and generates the background image using an unvaried region.

11. The image processing apparatus according to claim 10, wherein the predetermined position condition is a condition of a three-dimensional position including a distance.

12. The image processing apparatus according to claim 11, wherein the predetermined position condition is satisfied in a case where the distance exceeds a predetermined value.

13. The image processing apparatus according to claim 10, wherein the specific object includes an image of a person.

14. The image processing apparatus according to claim 10, wherein satisfying the predetermined position condition is based on a size of the specific object.

15. The image processing apparatus according to claim 10, further comprising a user interface that receives a designation of the predetermined position condition from a user.

16. The image processing apparatus according to claim 15, wherein the processor displays a predetermined space on a display and receives the designation of the predetermined position condition with respect to the predetermined space.

17. The image processing apparatus according to claim 16, wherein the processor superimposes and displays an image corresponding to the predetermined position condition, in the predetermined space.

18. The image processing apparatus according to claim 10, wherein the unvaried region is a temporally unvaried region containing only unvaried pixels.

* * * * *